Nov. 21, 1967   R. C. DAEM ETAL   3,353,526
ABRASIVE CUTTING TOOLS SUCH AS SAWS
Filed Oct. 12, 1964   3 Sheets-Sheet 2

INVENTORS
RICHARD C. DAEM
NIGEL W. GRAY
BRIAN YOUNG
By Irwin S. Thompson
ATTY.

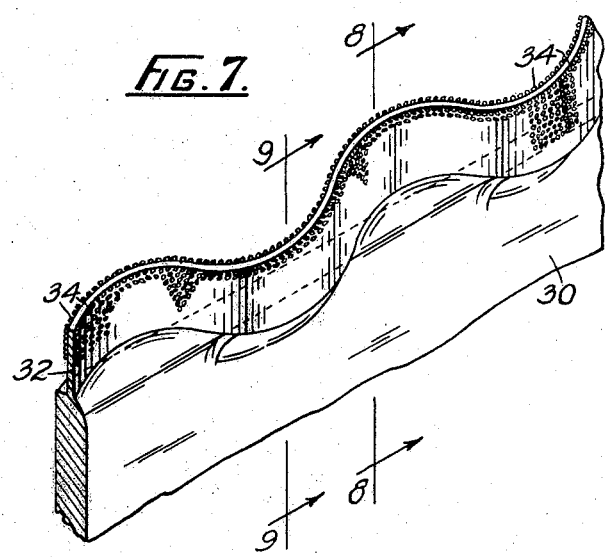
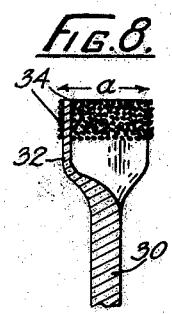
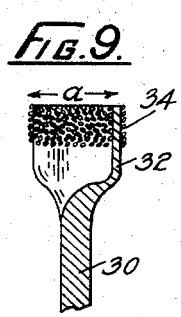

United States Patent Office 3,353,526
Patented Nov. 21, 1967

3,353,526
ABRASIVE CUTTING TOOLS SUCH AS SAWS
Richard C. Daem, Nigel W. Gray, and Brian Young, Johannesburg, Transvaal, Republic of South Africa, assignors to Boart & Hard Metal Products S.A. Limited
Filed Oct. 12, 1964, Ser. No. 403,170
Claims priority, application Republic of South Africa, Oct. 18, 1963, 4,717/63; Aug. 19, 1964, 3,937/64
7 Claims. (Cl. 125—15)

This invention relates to abrasive cutting tools such as saws in which the cutting zones incorporate abrasive particles such as diamond particles for cutting and often also for gauge holding purposes.

Known saws of the kind in question usually have a cutting edge composed of a binder metal and abrasive particles more or less evenly distributed through the binder. In one case a rotary saw blade with compacts of binder and abrasive secured in slots transverse to the cutting edge at thickened portions of the cutting edge has been made. In all known cases powder metallurgy or other complex techniques are involved.

An object of the invention is to provide a cutting tool that is simple to make and which continues to cut until substantially all the abrasive has worn away, without significant loss of gauge.

According to the invention the working zone of the tool is zigzag in shape in the cutting direction, with an adherent layer of abrasive particles applied to the zigzag sides of the cutting zone.

Several embodiments of the invention are illustrated in the accompanying drawings in which:

FIGURE 7 is a perspective view of another embodiment; and

FIGURE 8 is a transverse section on the line 8—8 in FIGURE 7.

FIGURE 9 is a transverse section on the line 9—9 in FIGURE 7.

Figure 1:
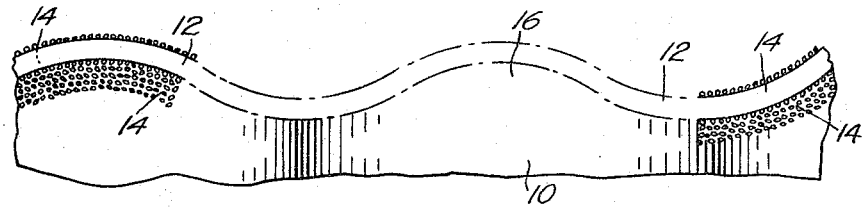
FIGURE 1 is a fragmentary sectional view of part of a saw according to the invention.
Figure 2:
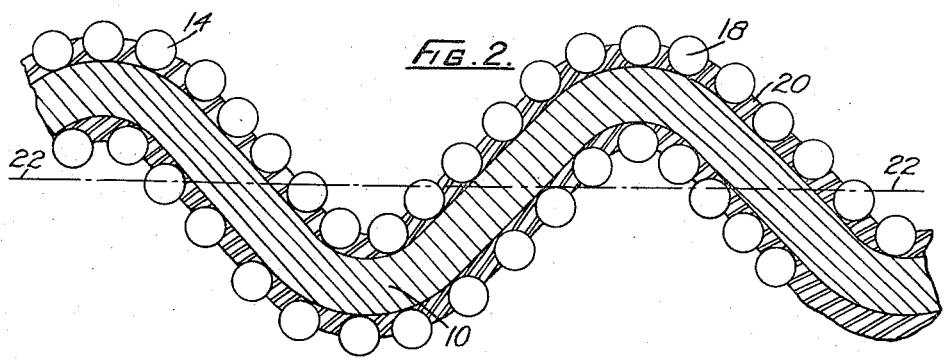
FIGURE 2 is a cross-sectional view of the saw, on an enlarged scale.

FIGURE 1 shows part of a saw. It comprises a metallic body 10 the edge 12 of which is the forward edge of the cutting zone. To the sides 14 flanking the edge 12 there are applied layers 16 of abrasive particles such as diamond grit. The particles 18 are held in a binder 20 (FIGURE 2).

Figure 3:
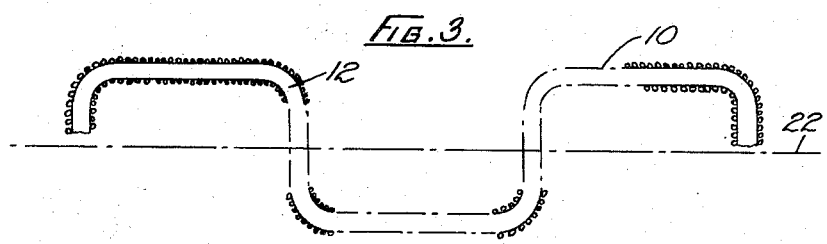
FIGURE 3 is an end view of one form of saw.
Figure 4:
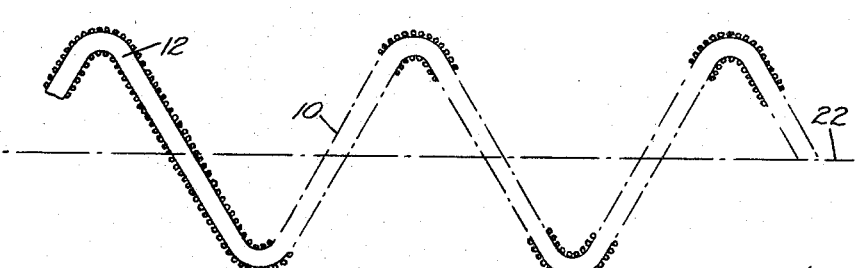
FIGURE 4 is an end view of another form of saw.

The body is zigzagged in end view, that is looking towards the edge 12, about a line of symmetry 22 (FIGURE 2), which is the mean centerline of the material of the core. The zigzagging may be sinuous, as shown in FIGURE 2 or it may take other forms such, for instance as shown in FIGURES 3 and 4. In FIGURE 3, it is crenelate and in FIGURES 4 and 5 serrate.

Figure 5:
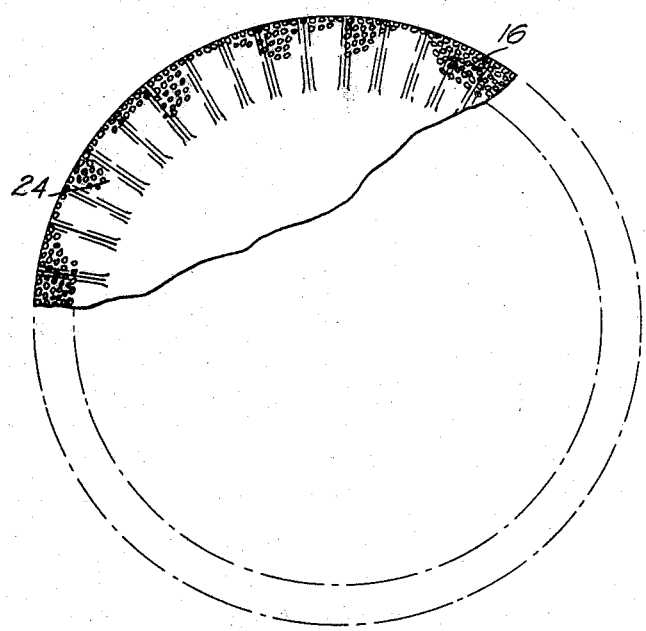
FIGURE 5 is a fragmentary face view of a circular saw.

The body will be shaped in accordance with the type of saw. Thus, for a hack- or bandsaw, it will be a ribbon. The zigzagging may extend across the full width of the ribbon so that the whole ribbon is corrugated, or the ribbon may be undulated only towards the cutting edge. The latter construction serves also for a circular saw or cutter, in which the body is a disc, as is shown in FIGURE 5. Here it will be seen that only the peripheral zone 24 of the body is undulated.

Figure 6:
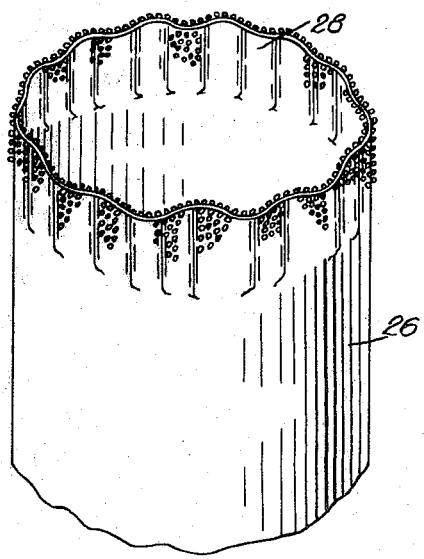
FIGURE 6 is a perspective view of a rotary core drill.

Another embodiment is shown in FIGURE 6 in which the tool is a rotary coring bit. The body, here, is a tube 26 made conveniently from sheet metal. The forward cylindroidal part 28 of the body is undulated to provide the zigzag cutting zone and, as in the other embodiments, the abrasive particles are located at both sides of the zone.

This construction has the advantage that the saw can be made rigid and robust while keeping the cutting zone thin, since the cutting zone is strengthened by reason of the deformation.

In the embodiment of FIGURES 7 to 9, the body 30 of the saw and the metal of the cutting zone 32 are integral, but the latter is considerably thinner than the metal of the body. Abrasive layers 34 are applied to each side of the zone 32. The cutting zone is, however, so corrugated that the crests of the corrugations project, at each side of the saw, beyond the contour of the body 30, so that the width of cut is wider than the width of body 30.

In all forms of the saw the effective cutting zones are the coated sides. There may be some initial advantage in applying abrasive particles to the forward edge 12, but this will last only as long as the particles on the edge persist. When they have worn or broken away, cutting will proceed, however. While with conventional saws the saw life is determined by wear of the cutting edge, in the saw of the invention the saw continues to operate efficiently as long as the abrasive layers 16 remain on the sides 14.

The whole length of each abrasive layer plays its part in cutting the workpiece, the full width of the cut being determined by the amplitude of the corrugations that is by the distance between the opposed peaks in the direction normal to the advance of the saw.

As the abrasive particles wear or are detached, the particles behind them are exposed and come into play so that there is no gauge loss and the saw goes on cutting until the abrasive layers are exhausted.

In an example of an embodiment according to FIGURES 7 to 9, as applied to a circular saw of 8″ diameter, the body 30 is .040″ thick. The reduced zone 32 is .020″ thick and is .250″ deep radially. The gauge of the cutting zone, that is the distance in the lateral direction from peak to peak of the corrugations a in FIGURE 8 or FIGURE 9, is .050″ to .070″. The thickness of the body 30 is .040″. The body is made of steel, but could be of bronze, brass, copper or any other suitable metallic or suitable non-metallic material, and the diamond particles are of 100/120 mesh (Tyler scale).

In examples of circular saws as shown in FIGURE 5, the dimensions are:

|  | (1) | (2) |
|---|---|---|
| Diameter (inch) | 5 | 8 |
| Thickness of body (inch) | .020 | .040 |
| Gauge (inch) | .050 | .060 |
| Number of sinuous corrugations | 180 | 180 |
| Abrasive | Diamond particles 100/120 mesh (Tyler scale) | |

The results of comparative tests carried out are shown in the table below. Six saws were used, as follows:

(1) An 8″ continuous periphery blade, bronze matrix,
(2) An 8″ segmented blade, steel matrix,
(3) An 8″ blade with laminated and brazed sheet steel matrix,
(4) A proprietary notched periphery type blade, steel matrix,
(5) An 8″ blade, corrugated cutting zone, according to FIGURE 5 of the invention,
(6) An 8″ blade, with thinned corrugated cutting zone (as shown in FIGURES 7 to 9).

The material sawed was norite. Spindle speed was 2,800 r.p.m. or 7,000 s.f.m. in all tests.

| Blade | Depth of Cut (inch) | Vol. Cut in Lineal sq. in. | Rate of Cut in./min. | Wear | Wear per 100 sq. in. |
|---|---|---|---|---|---|
| 1 | 1 | 1,000 | 4 | .010 | .001 |
| 2 | 1 | 1,000 | 4 | .023 | .002 |
| 3 | 1 | 204 | 2 | .021 | .010 |
| 4 | 1 | 244 | 2 | .014 | .006 |
| 5 | 1 | 690 | 5 | .015 | .002 |
| 6 | 1 | 1,000 | 5 | .010 | .001 |

These tests show that the blades of the invention compare very favourably in performance as estimated by the wear factor with a continuous periphery saw and are clearly as efficient as or more efficient than the other blades tested. Moreover there is a very free cutting blade in that it took a feed of 5″ per minute very readily and could be taken up to 8 inches per minute, although the rate of wear increased appreciably at this feed rate. It was found that both the No. 3 and No. 4 blades could not cut at a faster rate as the blades buckled and cut an excessively wide slot.

The abrasive particles may be secured in position on the surface of the body in any suitable manner for the particular use to which the saw is to be put. With diamond particles, metal bonding has been found to be very suitable. The metal bond may be applied electrolytically or in any other suitable manner. Other abrasive particles, e.g. silicon carbide, may be used with metal or resin bonds, depending on the duty the blade is to perform.

We claim:
1. An abrasive cutting tool in which the cutting edge comprises a core of non-abrasive material extending in zig-zag fashion across the means centerline of the material of the core with at least alternate limbs of the zig-zag crossing said centerline, and a single layer of abrasive grains adhering to each side of the core, that part of the core which is at the cutting edge being exposed.
2. The tool claimed in claim 1 in which each limb of the zig-zag crosses said centerline.
3. A circular cutting disc according to claim 2 in which the peripheral zone of the disc is undulated symmetrically to the plane of symmetry of the disc body to provide the zig-zag cutting zone.
4. An abrasive hack or band saw blade according to claim 2 in which the saw blade is zig-zagged at least towards the forward edge.
5. An abrasive tool as claimed in claim 2 in which said centerline is circular.
6. An abrasive tool as claimed in claim 2 in which the core is metallic.
7. An abrasive tool as claimed in claim 1 in which the core is metallic.

References Cited

UNITED STATES PATENTS

| | | | |
|---|---|---|---|
| 110,162 | 12/1870 | Roorbach. | |
| 693,306 | 2/1902 | Peckover | 125—18 |
| 824,946 | 7/1906 | McKay | 125—18 |
| 1,435,514 | 11/1922 | Burns | 51—206.3 X |
| 1,878,414 | 9/1932 | Legge | 51—207 X |
| 2,811,960 | 11/1957 | Fessel | 125—15 |
| 3,199,254 | 8/1965 | Baron | 51—309 |

ROBERT C. RIORDON, *Primary Examiner.*

D. G. KELLY, *Assistant Examiner.*